United States Patent
Mol et al.

[11] Patent Number: 5,856,855
[45] Date of Patent: Jan. 5, 1999

[54] EDGE-LIT ILLUMINATION SYSTEM CONTAINING CHOLESTERIC POLARIZER AND DIFFUSER BEHIND WAVEGUIDE

[75] Inventors: Grietje N. Mol; Dirk J. Broer; Christianne R.M. De Witz, all of Eindhoven, Netherlands

[73] Assignee: U.S. Philips Corporation, New York, N.Y.

[21] Appl. No.: 702,302

[22] Filed: Aug. 23, 1996

[30] Foreign Application Priority Data

Aug. 23, 1995 [EP] European Pat. Off. .............. 95202281

[51] Int. Cl.$^6$ .......................... G02F 1/1335; G02F 1/13; F21V 9/14; G01D 11/28
[52] U.S. Cl. .............................. 349/65; 349/98; 349/115; 349/194; 362/19; 362/26; 362/31
[58] Field of Search ............................. 349/98, 115, 194, 349/65; 362/19, 31, 26

[56] References Cited

U.S. PATENT DOCUMENTS

| | | | |
|---|---|---|---|
| 4,139,272 | 2/1979 | Laesser et al. | 350/337 |
| 4,212,048 | 7/1980 | Castleberry | 362/19 |
| 4,985,809 | 1/1991 | Matsui | 362/31 |
| 5,159,478 | 10/1992 | Akiyama et al. | 359/69 |
| 5,217,794 | 6/1993 | Schrenk | 428/220 |
| 5,325,218 | 6/1994 | Willett et al. | 359/65 |
| 5,506,704 | 4/1996 | Broer et al. | 359/65 |
| 5,557,343 | 9/1996 | Yamagishi | 348/781 |
| 5,587,816 | 12/1996 | Gunjima et al. | 349/96 |
| 5,721,603 | 2/1998 | De Vaan et al. | 349/194 |
| 5,737,044 | 4/1998 | Van Haaren et al. | 349/61 |
| 5,751,388 | 5/1998 | Larson | 349/96 |
| 5,764,322 | 6/1998 | Mamiya et al. | 349/65 |

FOREIGN PATENT DOCUMENTS

0606940 A2 7/1994 European Pat. Off. .
2257188 3/1989 Japan .

OTHER PUBLICATIONS

Society for Information Display SID 1992 Exhibit Guide,. Venue: Hynes Convention Center, Boston, MA Period: May 17–22, 1992 One reference sheet "Illuminator".

1990 SID International Symposium Digest of Technical Papers, First Edition May, 1990 Publisher: Society for Information Display, 8055 West Manchester Aved., Playa del Rey, CA 90293.

Primary Examiner—William L. Sikes
Assistant Examiner—Kari M. Horney
Attorney, Agent, or Firm—John C. Fox

[57] ABSTRACT

An illumination system (3) comprises an optical waveguide (9) of an optically transparent material having an exit surface (19) and four end faces (13, 14, 15, 16). The light from a light source (11) is coupled into the optical waveguide (9) via at least one of the end faces (13). The illumination system, for an LCD, further has a reflective polarizer (21) in combination with a diffuser (23) for polarizing the light supplied by the light source (11). The reflective polarizer (21) is integrated with the optical waveguide and constitutes the surface (25) of the optical waveguide (9) which is located opposite the exit surface (19). The diffuser (23) is present on a surface of the polarizer (21) remote from the optical waveguide (9).

16 Claims, 2 Drawing Sheets

EDGE-LIT ILLUMINATION SYSTEM CONTAINING CHOLESTERIC POLARIZER AND DIFFUSER BEHIND WAVEGUIDE

The invention relates to an illumination system comprising an optical waveguide of an optically transparent material having an exit surface and a plurality of end faces, opposite at least one of which a light source is situated, whose light can be coupled in at said end face of the optical waveguide, and polarizing means for polarizing the light emitted by the light source.

The invention also relates to a flat-panel picture display device comprising such an illumination system.

A flat-panel picture display device which is provided with an illumination system of the type described in the opening paragraph is known from United States patent U.S. Pat. No. 4,212,048. In the picture display device described in this Patent, a picture display panel is illuminated by means of an illumination system which consists of a wedge-shaped transparent plate and a light source. The light rays emitted by the light source are coupled in at the end face of the optical waveguide and propagate through the waveguide because they undergo total internal reflection at the interface between optical waveguide and air. Since the angle of incidence of the light rays on the waveguide-air interface decreases upon each reflection, this angle will be smaller at a given instant than the critical angle and the relevant light rays will leave the optical waveguide. Furthermore, the optical waveguide comprises polarizing means in the form of a strip of polarizing material which extends across the thickness of the optical waveguide in the vicinity of the light source. In this way, it is ensured that the light leaving the optical waveguide is polarized.

A drawback of the illumination system described in said U.S. patent is that substantially 50% of the light supplied by the light source is lost without being able to contribute to the formation of the image, because the polarizer is dichroic and thus absorbs the unwanted direction of polarization. A further drawback is that the optical waveguide must be wedge-shaped in order that light can be coupled out at the exit surface of the optical waveguide. Due to the requirement of a sufficient light output, the freedom of design or the choice of the material for the optical waveguide is limited. In fact, a short time after the light is coupled into the optical waveguide, it reaches the polarizer and is thus polarized. This polarized light propagates through the optical waveguide until it is incident on the exit surface at an angle which is smaller than the critical angle for total internal reflection, and is consequently coupled out. Since, in practice, isotropic material is not perfectly isotropic, there will still be depolarization during propagation through the optical waveguide. Consequently, the output of polarized light having the same direction of polarization is reduced considerably. Either the distance which is covered before coupling out should therefore be relatively short, which limits the freedom of design of the optical waveguide, or the material of the optical waveguide should be very much isotropic, which limits the choice of the material.

It is an object of the invention to provide an illumination system in which substantially all the light supplied by the light source has the same state of polarization upon leaving the optical waveguide, so that the light output is larger, and which provides a greater freedom of design and a wider choice of material for the optical waveguide.

To this end, the illumination system according to the invention is characterized in that the polarizing means are constituted by a reflective polarizer which is present on the surface of the optical waveguide located opposite the exit surface of the optical waveguide, a surface of the polarizer remote from the optical waveguide being provided with a diffuser.

The light emitted by the light source is unpolarized. When a light beam of this light is incident on the reflective polarizer, this beam will be split up into two beam components having complementary states of polarization. If the polarizer is a linear polarizer, the two beam components will have mutually perpendicular directions of polarization. If the polarizer is a circular polarizer, a levorotatory circularly polarized beam component and a dextrorotatary circularly polarized beam component will be formed.

One of the two complementary beam components will be reflected by the polarizer. The reflected beam component will be further referred to as the unwanted beam component. The other beam component, in other words, the desired beam component, will be passed by the polarizer. The desired beam component is understood to mean the component having the state of polarization which will be supplied by the illumination system. The beam component which will be passed and the beam component which will be reflected is determined by the structure of the polarizer.

The beam component reflected by the polarizer will further propagate in the optical waveguide and depolarize after having covered a given distance. This distance is dependent on the extent of birefringence of the material of the optical waveguide. After this distance, a part of this beam component will thus also have the desired direction of polarization and consequently be passed by the reflective polarizer towards the diffuser. The diffuser diffuses the beam incident thereon partly forwards and partly backwards. The forward-diffused light, the greater part of which consists of light having the desired direction of polarization, is incident again on the reflective polarizer and will thus acquire a purer direction of polarization. In fact, the quantity of light which would still have the unwanted direction of polarization after the first passage, is now also reflected for the greater part. Due to the second passage through the reflecting polarizer, the direction of polarization of the desired beam component is enhanced. In this way, a better contrast is obtained in a picture display device in which this illumination system is used. This enhanced contrast could not be realized, for example, if the polarizer were not integrated with the optical waveguide but would be present above the waveguide, because the light emitted by the light source would then pass the polarizer only once.

A reflective polarizer in itself has the advantage that substantially no light is absorbed by the polarizer so that there is substantially no heating.

The integration of the polarizer in the optical waveguide ensures that the illumination system is relatively thin and that there is less unwanted light conductor and fewer reflection losses occur.

A preferred embodiment of the illumination system according to the invention is characterized in that a reflector is arranged at the side of the diffuser remote from the reflective polarizer.

The light having the unwanted direction of polarization and leaving the optical waveguide via the diffuser is reflected by this reflector towards the optical waveguide. The beam component having the desired direction of polarization is passed by the polarizer and subsequently coupled out via the exit surface, while the beam component having the unwanted direction of polarization is reflected again by the polarizer towards the diffuser.

By repeated diffusion and reflection without any noticeable absorption, substantially all the light supplied by the light source is converted into light having the same state of polarization.

A further embodiment of the illumination system according to the invention is characterized in that the reflector is a polarization-rotating or depolarizing reflector.

If the polarizer is circular and the two polarization components are a levorotatory circularly polarized beam and a dextrorotatary circularly polarized beam, the polarization-rotating element is preferably a specular reflector. The direction of polarization of a circularly polarized beam is inverted at such a reflector.

If the polarizer is linear and the two polarization components are two mutually perpendicularly linearly polarized beams, the polarization-rotating element may be, for example, a $\lambda/4$ plate with a reflector arranged behind it.

If the reflector has a depolarizing effect, the light having the unwanted direction of polarization passed by the polarizer is depolarized so that approximately half thereof immediately has the desired direction of polarization. This choice of polarizer is applicable to both linearly and circularly polarized light.

The illumination system according to the invention is preferably characterized in that the reflector is a foil comprising particles which reflect substantially completely.

In this way, the absorption is minimal and a relatively high light output is obtained.

A further embodiment of the illumination system according to the invention is characterized in that a reflector having a depolarizing effect is arranged on at least one end face remote from a light source.

It is known per se to provide the optical waveguide of an illumination system for a flat-panel picture display device with a reflector at the end faces where no light is coupled in, so as to prevent that light arriving there is lost and thus does not contribute to the light output of the illumination system. Due to the reflector, the light remains in the optical waveguide. In this way, this light will have another chance of being converted at least partly into light having the desired state of polarization and of being coupled out as yet at the exit surface.

If the reflectors at the end faces have a depolarizing effect, light incident thereon, which has a state of polarization which is unwanted to be coupled out at the exit surface, is depolarized, so that approximately half of this light immediately acquires the suitable direction of polarization and can be coupled out of the optical waveguide. Dependent on the material of the optical waveguide, the other half of the light will depolarize or not depolarize during propagation. The advantage of the depolarizing reflectors is that depolarization occurs independently of the extent of birefringence of the optical waveguide material.

A first embodiment of the illumination system according to the invention is characterized in that the reflective polarizer is a cholesteric polarizer.

A cholesteric polarizer is a polarizer comprising a layer of liquid crystalline material having a cholesteric ordering. Such a polarizer is particularly suitable as a reflective polarizer. In this type of liquid crystalline material, the chiral molecules have such a structure that they spontaneously order in solution to a spiral or helix-like structure. This helix-like structure may be directed in such a way that the axis of the helix will be transverse to the layer.

When unpolarized light is incident on such a polarizer, the beam component of the light which matches the (dextrorotatary or levorotatory) direction of the helix and whose wavelength matches the pitch of the helix will be reflected, whereas the other beam component will be passed.

A further embodiment of the illumination system according to the invention is characterized in that the cholesteric polarizer is implemented as a single layer of a liquid crystalline polymer material, within which layer the pitch of the molecular helix varies substantially continuously between two values which correspond to the lower limit and the upper limit, respectively, of the reflection band required to cover the full visible wavelength range.

Since the pitch of the helix varies across the layer, a relatively large reflection bandwidth can be achieved, and it is even possible to cover the full visible wavelength range with a single-layer cholesteric polarizer. For the same reflection bandwidth, a single-layer cholesteric polarizer is thinner than a multilayer stack in which each of the layers has a limited bandwidth.

A further advantage of a pitch which is variable across the layer of the polarizer is that the reflection bandwidth can be chosen to be so wide that the band shift which occurs upon light incidence at a large angle with respect to the normal on the polarizer does not have any detrimental influence on the polarizing effect of the cholesteric layer.

For detailed information about the manufacture of a single-layer cholesteric polarizer, reference is made to European Patent Application EP 0 606 940.

A further embodiment of the illumination system according to the invention is characterized in that the illumination system comprises an $n.\lambda/4$ plate, in which n is an integral, odd number.

If it is desirable that the light supplied by the illumination system is linearly polarized, the light passed by the cholesteric polarizer towards the exit surface of the optical waveguide is to be converted into linearly polarized light before it leaves the optical waveguide.

This embodiment of the illumination system according to the invention is characterized in that the $n.\lambda/4$ plate is present on the exit surface of the optical waveguide.

A $\lambda/4$ plate, particularly a wideband $\lambda/4$ plate is very suitable for this purpose. Such a plate is known per se from, for example, the article: "Retardation Film for STN-LCDs 'NRF'" of the firm of Nitto Denko in SID '92 Exhibit Guide, Society for Information Display, May 17–22, 1992, Boston, Mass., U.S.A.

The cholesteric layer may be a self-supporting film but may also be provided on a substrate. If the layer is provided on a substrate, an embodiment of the illumination system according to the invention may be characterized in that the $n.\lambda/4$ plate is present between the cholesteric layer and the optical waveguide.

If the cholesteric layer is not a self-supporting film, the extra substrate may be dispensed with and the cholesteric layer may be provided on the $\lambda/4$ plate which then functions as the substrate.

Another embodiment of the illumination system according to the invention is characterized in that the $n.\lambda/4$ plate functions as an optical waveguide.

Instead of providing the illumination system with a separate optical waveguide and a separate polarization rotator, these two functions can be combined in a single element in the form of a $\lambda/4$ plate. The illumination system may thus become even thinner.

An alternative embodiment of the illumination system according to the invention is characterized in that the reflective polarizer is a linear polarizer which is implemented as a stack of layers comprising a birefringent material or as a stack of layers being alternately birefringent and non-birefringent.

In this embodiment, the beam components are linearly polarized and a $\lambda/4$ plate is consequently superfluous.

Such a polarizer may be made by means of a single-step extrusion. An example of such a polarizer is described extensively in United States patent U.S. Pat. No. 5,217,794.

A further embodiment of the illumination system according to the invention is characterized in that the diffuser is a thin film which is provided on the surface of the reflective polarizer.

Such a film can be provided in a simple manner on the cholesteric layer or its substrate.

Another embodiment of the illumination system according to the invention is characterized in that the diffuser is a light-diffusing structure provided in the surface of the reflective polarizer.

A further embodiment of the illumination system according to the invention is characterized in that the light-diffusing structure is constituted by a pattern of discrete diffusing areas.

The advantage of such a pattern is that its configuration can be adapted to the desired light distribution on the exit surface of the optical waveguide. In a regular pattern, the intensity will decrease as these areas are further remote from the light source. By adapting the pattern of the light-diffusing areas, for example, by increasing the density as the distance to the light source increases, it can be ensured that the intensity distribution on the complete surface of the optical waveguide becomes homogeneous.

These and other aspects of the invention will be apparent from and elucidated with reference to the embodiments described hereinafter.

Figure 1:
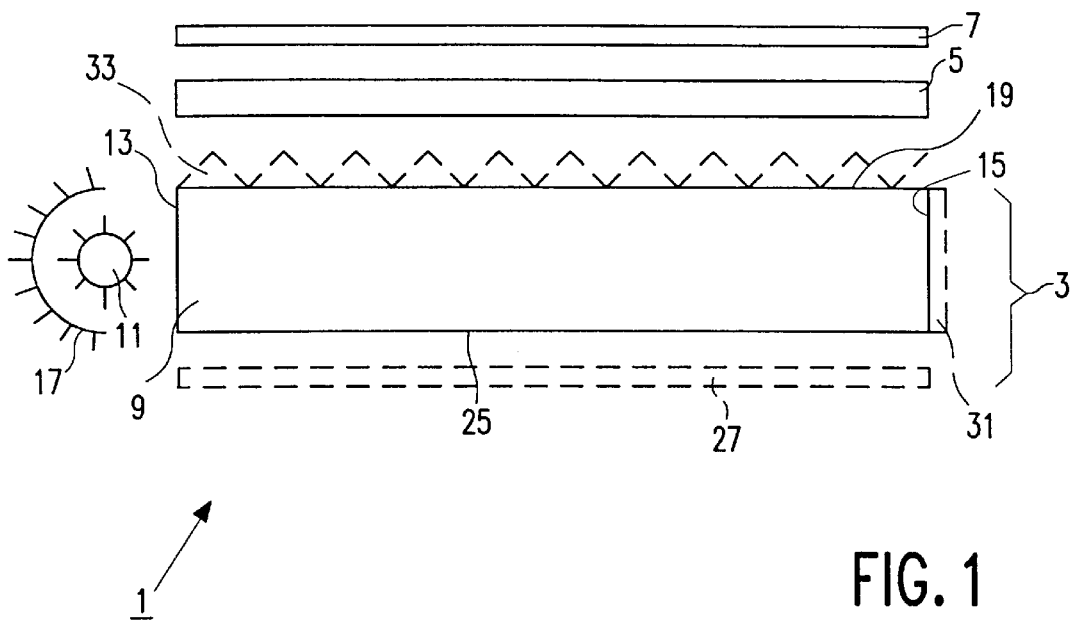
FIG. 1 shows diagrammatically a flat-panel picture display device.

The flat-panel picture display device 1 shown diagrammatically in FIG. 1 comprises an illumination system 3, a picture display panel 5 and an analyzer 7. The illumination system 3 comprises an optical waveguide 9 of an optically transparent material and a light source 11. The optical waveguide 9 has four end faces 13, 14, 15, 16, at least two of which face each other. At one of the end faces, for example, 13, the light from the light source 11 is coupled into the optical waveguide 9. The light source 11 may be, for example, a rod-shaped fluorescence lamp, or a light-emitting diode (LED) if the illumination system is used in flat-panel picture display devices with small picture display panels such as, for example, a cellular telephone. The optical waveguide may consist of a synthetic material, for example, PMMA or polycarbonate. The light source 11 is at least partly surrounded by a reflector 17 which ensures that light emitted by the light source 11 in a direction remote from the optical waveguide 9 is as yet sent towards the optical waveguide 9. The exit surface 19 of the optical waveguide 9 is directed towards the picture display panel 5.

The picture display panel 5 may comprise, for example, a liquid crystalline material and be provided with a matrix of pixels whose operation may be based on the twisted nematic effect (TN), the supertwisted nematic effect (STN), or the ferroelectric effect so as to modulate the direction of polarization of light incident thereon.

Figure 2:
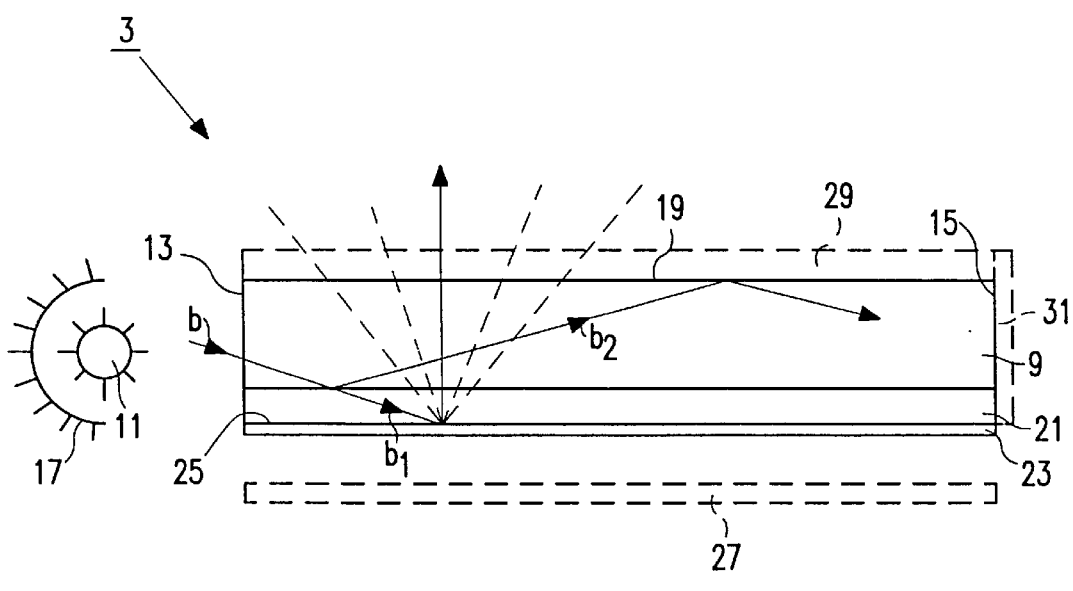
FIG. 2 shows diagrammatically an embodiment of an illumination system according to the invention, in which the beam path is also illustrated.
Figure 3A:
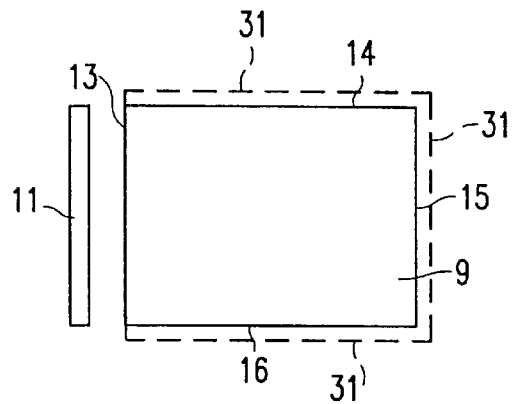
FIGS. 3a to 3d show some embodiments of an illumination system according to the invention, with different light source configurations.
Figure 3B:
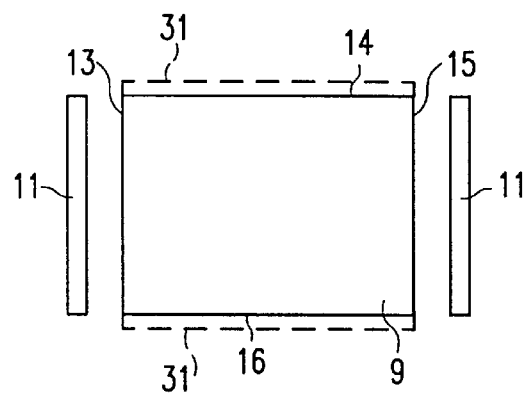
Figure 3C:
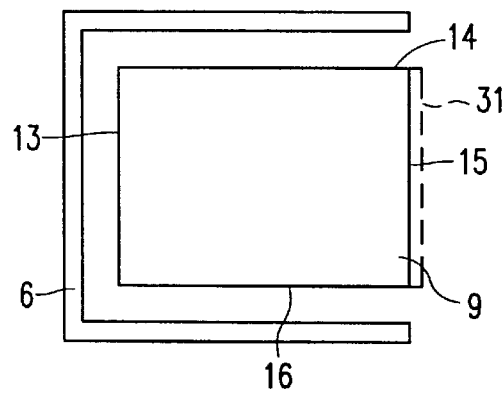
Figure 3D:
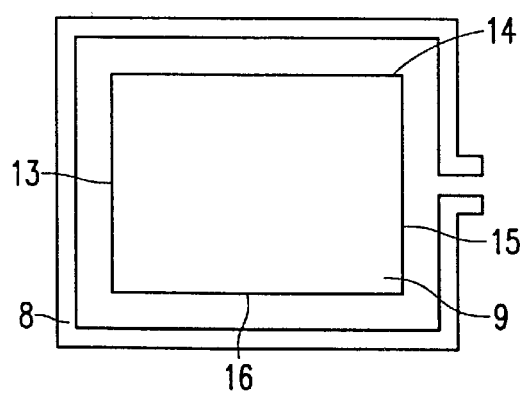

In the illumination system 3 according to the invention, substantially all the unpolarized light supplied by the light source 11 is converted into light having substantially the same direction of polarization. To this end, the illumination system 3 comprises polarizing means. FIG. 2 shows an embodiment. The polarizing means are constituted by a reflective polarizer 21 in combination with a diffuser 23. The reflective polarizer 21 is integrated with the optical waveguide 9 and constitutes the surface 25 of the optical waveguide located opposite the exit surface 19. The diffuser 23 is present on the surface 25.

FIG. 2 illustrates the beam path in the optical waveguide 9. An unpolarized light beam b emitted by the light source 11 is coupled into the optical waveguide 9 via the end face 13 and is incident on the reflective polarizer 21. This polarizer 21 will split up the incident beam b into two beam components $b_1$, $b_2$ having complementary states of polarization. The polarization of the beam component $b_1$ passed by the polarizer 21 will further be referred to as the desired direction of polarization, because this beam component has the direction of polarization which will be supplied by the illumination system. The reflected beam component $b_2$ has the unwanted direction of polarization. The passed beam component $b_1$ reaches the diffuser 23 where it is partly diffused backwards, out of the illumination system 3, but mainly forwards towards the picture display panel 5. The light diffused towards the picture display panel 5 is incident again on the reflective polarizer 21 which will pass the desired direction of polarization towards the picture display panel 5 and reflect the unwanted direction of polarization back to the diffuser 23. The diffuser 23 preferably maintains the polarization. In that case, the polarization of the desired beam component will be enhanced upon the second passage through the polarizer 21.

The unwanted beam component $b_2$ which is reflected into the optical waveguide by the polarizer 21 further propagates through the optical waveguide 9 and will depolarize after some time, dependent on the birefringence of the material of the optical waveguide 9. In this way, at least a part of this beam component acquires the suitable direction of polarization to be coupled out of the optical waveguide 9.

To prevent light from leaving the illumination system 3 via the diffuser 23, which would lead to a reduction of the light output, a reflector 27 is arranged at the side of the diffuser 23 remote from the polarizer 21. This reflector 27 ensures that light leaving the illumination system 3 at the side remote from the picture display panel 5 is reflected towards the optical waveguide 9 so as to be coupled in again.

The reflector 27 may be, for example, an aluminium foil. The reflector 27 is preferably implemented as a foil which comprises particles showing hardly any or no absorption. The particles may be, for example, $BaSO_4$ or $TiO_2$.

In the illumination system 3 according to the invention, the reflective polarizer 21 is integrated in the optical waveguide 9 and there is no interspace between these components, so that the picture display device 1 may be implemented in a very thin form. Due to the integration with the optical waveguide 9, there will be a relatively small loss of light as a result of unwanted light conduction and unwanted reflections.

The reflective polarizer 21 may be implemented in different ways. In a first embodiment, the polarizer comprises a layer of liquid crystalline material having a cholesteric ordering. In this type of liquid crystalline material, the chiral molecules have such a structure that they spontaneously order in solution to a spiral or helix-like structure having a pitch p. This helix-like structure may be directed in such a way that the axis of the helix will be transverse to the layer.

When unpolarized light is incident on such a polarizer, the beam component of the light which matches the (dextrorotatary or levorotatory) direction of rotation of the helix and whose wavelength matches the pitch p of the helix will be reflected, whereas the other beam component will be passed. The reflection wavelength $\lambda_o$ of a cholesteric layer is given by:

$$\lambda_o = \tfrac{1}{2}(n_o + n_e)p$$

Here, p is the pitch of the molecular helix and $n_o$ and $n_e$ are the ordinary and the extraordinary refractive index, respectively, of the liquid crystalline material.

The cholesteric polarizer may be composed of a plurality of layers within which the pitch is constant, but in which each layer is active in a different wavelength range. The different wavelength ranges may be chosen to be such that all layers combined cover the full visible wavelength range. In this way, it is possible to use the illumination system in a colour picture display device.

The cholesteric polarizer preferably consists of a single layer of liquid crystalline polymer material in which the pitch of the molecular helix varies substantially continuously between two values which correspond to the lower limit and the upper limit, respectively, of the reflection band which is required to cover the full visible wavelength range (between 400 and 780 nm). In this way, it is sufficient to use a much thinner polarizer than in the case of stacked layers. A further advantage is that a single-layer polarizer has a better optical quality. The quality for cholesteric polarizers decreases with an increasing number of layers due to errors which are typical of cholesterics. Moreover, the range of angles of incidence of light to be polarized, within which the polarizer is effective, decreases with an increasing thickness. An advantage of a polarizer consisting of a single cholesteric layer is that the bandwidth can be chosen to be such that the band shift which occurs upon light incidence at a large angle with respect to the normal to the polarizer has no detrimental influence on the polarizing effect. In fact, with a non-perpendicular incidence on the cholesteric layer, there is an extra birefringence which increases with an increasing angle of incidence. The shift of reflection wavelength $\lambda_\alpha$ with respect to the reflection wavelength $\lambda_o$ upon perpendicular incidence varies in accordance with the following relation:

$$\lambda_\alpha = \lambda_o \cos\{\arcsin[2\sin\alpha/(n_e + n_o)]\}$$

in which $\alpha$ is the viewing angle with respect to the normal on the cholesteric layer and $n_e$ and $n_o$ are the extraordinary and the ordinary refractive index, respectively, of the cholesteric material.

For example, for an angle of incidence $\alpha = 80°$ and for reflection of light in the wavelength band of 400–700 nm, the bandwidth of the polarizer should range between 400 and 890 nm.

Another possibility of manufacturing a cholesteric polarizer is to stack a plurality of cholesteric layers, at least a number of which have a pitch continuously varying across the layer thickness. In this way, it is sufficient to use a much smaller number of layers than in the first-mentioned case.

It is to be noted that it is known per se that cholesteric layers are suitable as polarizers. Cholesteric polarizers are known, for example, from the article "Polarizing Color Filters made from Cholesteric LC Silicones" by R. Maurer et al. in SID International Symposium 1990, Digest of Technical Papers, pp. 110–113.

The reflective polarizer may be implemented as a linear polarizer comprising a stack of birefringent layers or a stack of layers being alternately birefringent and non-birefringent.

If the reflective polarizer is implemented as a cholesteric polarizer and the picture display panel is adapted to modulate linearly polarized light, the illumination system 3 should further comprise a $\lambda/4$ plate 29 which preferably has a wide bandwidth.

A wideband $\lambda/4$ plate is a transparent element which is composed of, for example, different layers and realizes such a phase rotation in a beam for all wavelengths in the visible wavelength range that circularly polarized light is converted into linearly polarized light. Such a $\lambda/4$ plate is known, for example, from the article "Retardation Film for STN-LCDs 'NRF'" of the firm of Nitto Denko in SID '92 Exhibit Guide, Society for Information Display, May 17–22, 1992, Boston, Mass., U.S.A.

The $\lambda/4$ plate 29 may be present on the exit surface 19 of the optical waveguide 9, as is shown in FIG. 2. If the cholesteric layer should be provided on a separate substrate, the $\lambda/4$ plate 29 may be present between the substrate and the cholesteric layer instead of on the exit face 19 of the optical waveguide 9. Instead of a separate substrate, the $\lambda/4$ plate 29 may function as a substrate to be provided with the cholesteric layer.

In the case of a linear reflective polarizer, a $\lambda/4$ plate is superfluous because the light is linearly polarized right away in the optical waveguide 9.

The diffuser 23 may also be implemented in different manners. The diffuser 23 may be provided as a thin film on the surface of the reflective polarizer 21. During or after the manufacture of the polarizer, the desired diffusing structure can be provided in the surface of the polarizer, for example, by means of a hot die or by means of a replica technique. Another possibility is to mechanically roughen the surface of the polarizer.

However, generally a flat-panel picture display device comprises diffusing means for spreading the intensity across the exit surface 19 of the optical waveguide 9. If the diffuser is implemented as a pattern of light-diffusing areas, the configuration of the pattern can be adapted in such a way that the intensity distribution of the light supplied by the illumination system 3 is homogeneous across the exit surface 19. In fact, as the light coupled out at the exit surface 19 originates from diffusing areas which are further remote from the end face via which the light was coupled into the optical waveguide 9, its intensity decreases. This phenomenon can be compensated for by increasing the density of the light-diffusing areas as the distance to the light source increases. This principle is already known from hitherto known flat-panel picture display devices using conventional absorbing polarizers. An example is described in United States patent U.S. Pat. No. 4,985,809.

Instead of providing a fluorescence lamp or a LED at only one end face 13, a light source 11 may also be provided at the opposite end face 15 so as to achieve a greater luminance. It is also possible to provide a light source at a third end face 14 and possibly at a fourth end face 16. In the case of rod-shaped lamps as light sources, a single rod-shaped lamp 6, 8 having a number of bends may be used to illuminate three or four end faces, instead of providing a separate light source per end face. The efficiency of the illumination system is consequently enhanced. Said possibilities are illustrated in FIGS. 3a to 3d.

To realize a maximal light output, each end face on which no light source is present may be provided with a reflector 31 so as to keep the light arriving there in the optical waveguide 9 and still enable it to be coupled out towards the picture display panel 5 with the desired direction of polarization. This reflector preferably has a depolarizing effect. Light having the unwanted direction of polarization reaching the reflector will then be depolarized so that approximately half thereof will immediately acquires the suitable direction of polarization. If the reflector does not depolarize, the depolarization depends on the extent of birefringence of the material constituting the optical waveguide.

If the illumination system is used in a picture display device in which a very high contrast is desired, an extra polarizer may be arranged at the side of the illumination system facing the picture display panel, so as to obstruct the passage of light having the unwanted direction of polarization to the picture display panel. If this polarizer is a reflecting polarizer, the reflected light can be recuperated in the illumination system and there is substantially no loss of light.

Moreover, the illumination system 3 may be provided with an element 33 concentrating the radiation to a beam (see FIG. 1). This element 33 may be implemented, for example, as a one-dimensional or two-dimensional prism structure. The light exiting from the illumination system can then be concentrated to a beam within an angle which is smaller than the angle within which the light leaves the optical waveguide, resulting in an increase of the brightness within a given viewing angle. The angular area in which the light is concentrated to a beam, and thus the viewing angle within which a great brightness is desired, is determined by the angles of inclination of the prism edges and by the refractive index of the material of the element 33. The use of such a radiation-concentrating element in flat-panel picture display devices is known, for example, from the English language abstract of JP-A 2-257188.

We claim:

1. An illumination system comprising an optical waveguide of an optically transparent material having an exit surface and a plurality of end faces, opposite at least one of which a light source is situated, whose light can be coupled in at said end face of the optical waveguide, and polarizing means integrated with the optical waveguide for polarizing the light emitted by the light source, characterized in that the polarizing means are constituted by a reflective polarizer which is present on the surface of the optical waveguide located opposite the exit surface of the optical waveguide, a surface of the polarizer remote from the optical waveguide being provided with a diffuser.

2. An illumination system as claimed in claim 1, characterized in that a reflector is arranged at the side of the diffuser remote from the reflective polarizer.

3. An illumination system as claimed in claim 2, characterized in that the reflector is a polarization-rotating or depolarizing reflector.

4. An illumination system as claimed in claim 2, characterized in that the reflector is a foil comprising particles which reflect substantially completely.

5. An illumination system as claimed in claim 1, characterized in that a reflector which has a depolarizing effect is arranged on at least one end face remote from a light source.

6. An illumination system as claimed in claim 1, characterized in that the reflective polarizer is a cholesteric polarizer.

7. An illumination system as claimed in claim 6, characterized in that the cholesteric polarizer is implemented as a single layer of a liquid crystalline polymer material, within which layer the pitch of the molecular helix varies substantially continuously between two values which correspond to the lower limit and the upper limit, respectively, of the reflection band required to cover the full visible wavelength range.

8. An illumination system as claimed in claim 6, characterized in that the illumination system comprises an $n.\lambda/4$ plate, in which n is an integral, odd number.

9. An illumination system as claimed in claim 8, characterized in that the $n.\lambda/4$ plate is present on the exit surface of the optical waveguide.

10. An illumination system as claimed in claim 8, characterized in that the $n.\lambda/4$ plate is present between the cholesteric layer and the optical waveguide.

11. An illumination system as claimed in claim 8, characterized in that the $n.\lambda/4$ plate functions as an optical waveguide.

12. An illumination system as claimed in claim 1, characterized in that the reflective polarizer is a linear polarizer which is implemented as a stack of layers comprising a birefringent material, or as a stack of layers being alternately birefringent and non-birefringent.

13. An illumination system as claimed in claim 1, characterized in that the diffuser is a thin film which is provided on the surface of the reflective polarizer.

14. An illumination system as claimed in claim 1, characterized in that the diffuser is a light-diffusing structure provided in the surface of the reflective polarizer.

15. An illumination system as claimed in claim 14, characterized in that the light-diffusing structure is constituted by a pattern of discrete diffusing areas.

16. A flat-panel picture display device including an illumination system provided with a picture display panel for modulating the direction of polarization of light generated by the illumination system in conformity with picture information to be displayed, and an analyzer, characterized in that the illumination system is an illumination system as claimed in any one of the preceding claims.

* * * * *